United States Patent

Schaefer

[15] 3,665,683
[45] May 30, 1972

[54] VACUUM CLEANER HAVING PRE-FILTER AND DUST BAG

[72] Inventor: Harold W. Schaefer, Bloomington, Ill.

[73] Assignee: National Union Electric Corporation, Stamford, Conn.

[22] Filed: Sept. 29, 1969

[21] Appl. No.: 861,950

[52] U.S. Cl..................................55/372, 55/473, 55/522, 15/327 R
[51] Int. Cl..........................................B01d 46/02
[58] Field of Search..........................55/319, 278, 361–382, 55/467, 470–473, 522; 15/327

[56] References Cited

UNITED STATES PATENTS

| 2,232,913 | 2/1941 | Heuberger | 55/278 |
| 2,300,266 | 10/1942 | Smellie | 15/326 |
| 2,333,449 | 11/1943 | Stahl | 55/368 |
| 2,935,158 | 5/1960 | Braun | 55/334 |
| 3,226,758 | 1/1966 | Brown et al. | 15/327 R |
| 3,365,864 | 1/1968 | Iizimc | 55/471 |
| 3,440,805 | 4/1969 | Cordell | 55/368 |
| 2,249,013 | 7/1941 | Levengood | 55/372 |
| 2,260,237 | 10/1941 | Stahl | 15/326 |
| 2,784,800 | 3/1957 | Segesman | 55/371 |
| 3,396,517 | 8/1968 | Schwab | 55/368 |

Primary Examiner—Bernard Nozick
Attorney—Hibben, Noyes & Bicknell

[57] ABSTRACT

A pre-filter for a vacuum cleaner having a disposable filter bag collecting the dirt from the air stream passing through the cleaner. The pre-filter is located in the air stream of the vacuum cleaner before the stream reaches the disposable filter bag. The pre-filter comprises a fine dirt entrapping material the surface of which contacts and removes the fine dirt which tends to clog the filter bag and thus prevents the filter bag from becoming clogged by the fine dirt.

2 Claims, 5 Drawing Figures

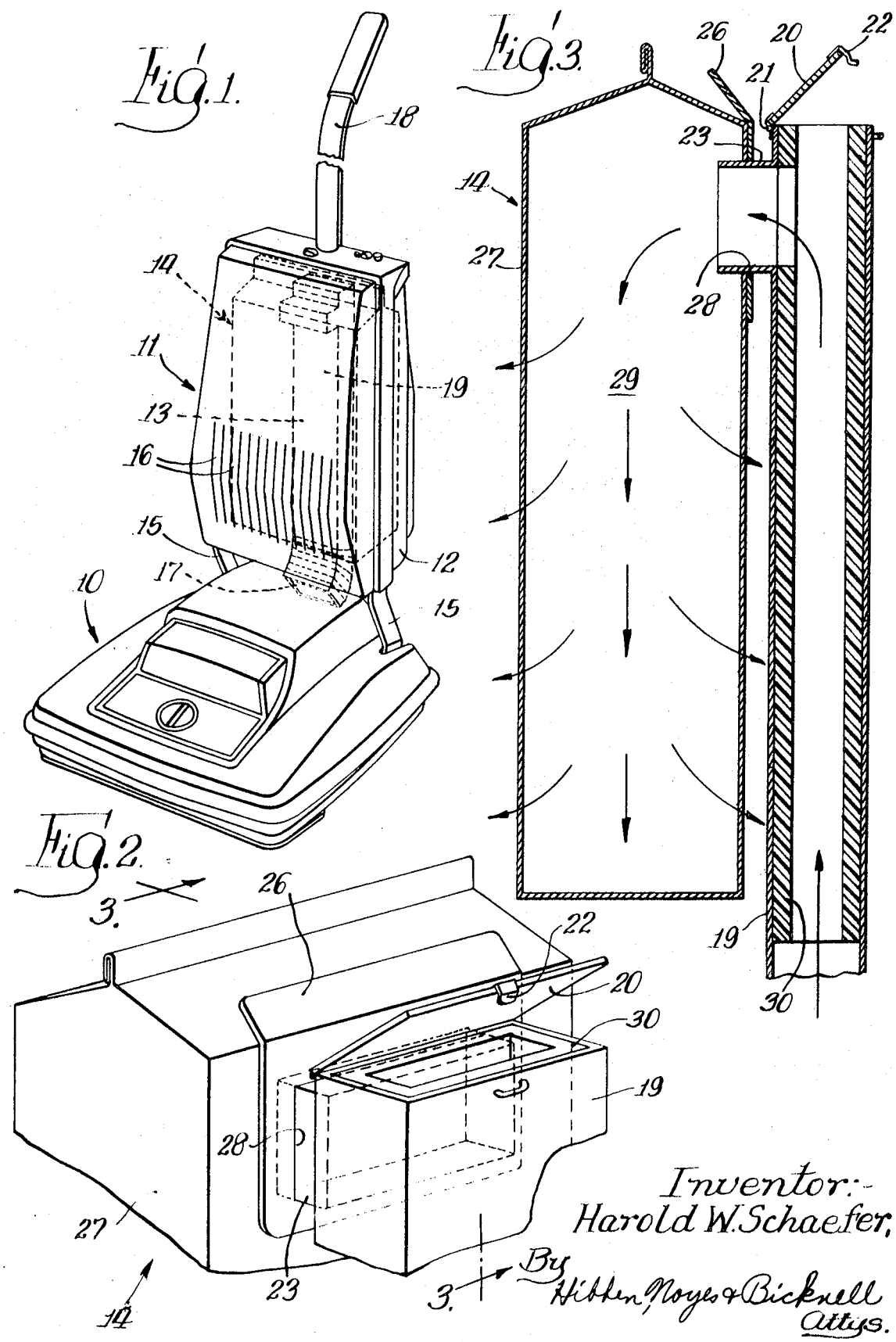

Patented May 30, 1972

VACUUM CLEANER HAVING PRE-FILTER AND DUST BAG

A vacuum cleaner sucks in dirt-laden air and exhausts relatively clean air. Vacuum cleaners commonly are fitted with a disposable filter bag which separates the dirt from the air. The dirt is trapped within the bag and the air is permitted to pass through the bag. After the bag has been filled to capacity, it is removed from the vacuum cleaner and replaced with an empty bag.

Filter bags must be capable of removing very fine dirt particles from the air without becoming clogged because a vacuum cleaner will not clean properly with a clogged filter bag and may overheat and be damaged. Paper filter bags in present use have suffered from the disadvantages of the pores of the paper becoming clogged by fine dirt particles and the bags have become inoperative before they have been filled to physical capacity. This disadvantage results in more frequent replacement of filter bags and/or improper operation of the vacuum cleaner with a clogged bag.

The present invention eliminates this disadvantage by providing a pre-filter element which has a surface capable of entrapping fine dirt particles which would normally clog the filter bag. The pre-filter element is exposed to the dirt and air stream before it reaches the filter bag and removes the fine dirt particles which tend to clog the pores of the filter bag. The pre-filter results in a more efficient utilization of the filter bag since the bag need not be discarded until it has been filled to its physical capacity with dirt and results in less frequency replacement of the filter bag.

In the accompanying drawings,

FIG. 1 is a perspective view of an upright vacuum cleaner embodying one form of the invention;

FIG. 2 is an enlarged fragmentary perspective view of a portion of the structure shown in FIG. 1;

FIG. 3 is a vertical cross-sectional view taken on the line 3—3 of FIG. 2;

Figure 5:
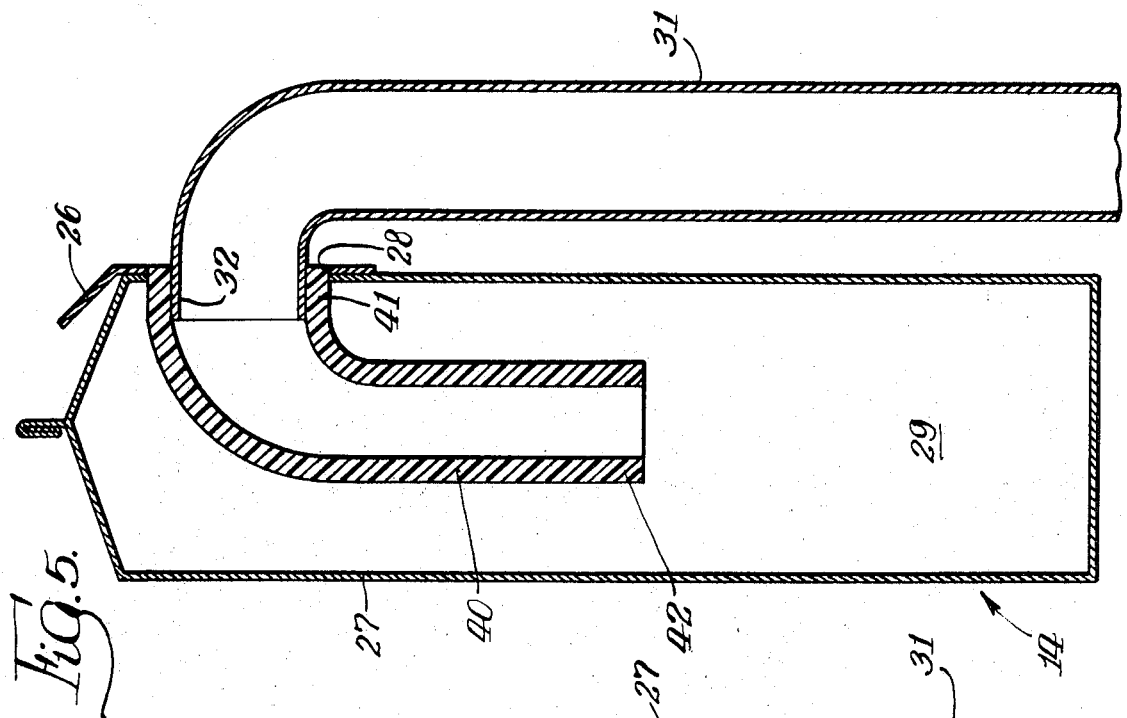
FIG. 5 is a vertical cross-sectional view taken on the line 5—5 of FIG. 4.

In general terms, the invention comprises a pre-filter means adapted for use with a vacuum cleaner having a disposable filter bag of a material, such as paper, in which the pores or interstices tend to become clogged with fine dirt particles. The invention may be used with any type of vacuum cleaner which employs a disposable filter bag of the foregoing type, but for simplicity, it will be described in two forms for use with upright cleaners.

Shown in FIG. 1 is an upright vacuum cleaner which comprises a cleaning unit or head 10, a bag support unit 11, an exhaust duct connector 13, an exhaust duct 19, and a disposable filter bag 14.

The cleaning unit 10 has a conventional electric motor and fan unit (not shown) which generates the suction forces which suck in the dirt and air during cleaning. At the rear of the cleaning unit 10 is an exhaust outlet 17 through which flows the exhaust air and the suspended dirt that has been removed from the article or surface being cleaned.

The bag support 11 comprises a generally rectangular hollow housing 12 which, for example, may be made of a substantially rigid plastic and the lower end of which is pivotally secured to the cleaning unit 10, as by a pair of arms 15. The front wall of the housing 12 is provided with air exhaust passages such as the slots 16. To the upper end of the bag support unit 11 is secured a handle 18. The bag 14 is contained in the hollow interior of the housing 12 which protects the disposable filter bag 14, hereinafter described, from damage.

The exhaust duct connector 13 comprises a flexible hose which connects the exhaust outlet 17 of the cleaning unit 10 to an upright hollow exhaust duct 19, which is mounted within the housing 12 of the bag support unit 11. The duct 19 is generally tube-like and may have, as shown in FIG. 2, a rectangular cross section. Slightly below the upper end of the duct 19 a short branch section 23 extends horizontally. The short branch section 23 provides a means for attaching the filter bag 14, as is hereinafter described. In the form of the invention shown in FIGS. 2 and 3, the upper end of the exhaust duct 19 comprises an access opening which is provided with a door or closure 20. The door 20 has a hinge 21 which secures one edge of the door to the duct 19 and a latch 22 which releasably secures the opposite edge of the door to the duct 19. The use of the door 20 will be hereinafter described.

The disposable filter bag 14 comprises a generally rectangular cardboard mounting flange or collar 26 and a bag portion 27. The collar 26 has a rectangular opening 28 and is secured by adhesive means around a similar opening in the side wall of the bag portion 27. The bag portion 27 is constructed of an air permeable material such as porous paper and forms and encloses a dirt collection chamber 29. Generally, the material of which the bag portion 27 is made will allow air to pass through but will not allow dirt to pass through the porous openings. The porous paper generally used for this purpose has very small openings or pores which tend to become clogged or blocked by fine dirt particles thus severely restricting the passage of air through the bag. The filter bag 14 is removably secured to the exhaust duct 19 in this instance by means of frictional engagement of the opening 28 of the collar 26 with the short branch section 23 of the exhaust duct 19.

The porous paper used for disposable vacuum cleaner filter bags, such as the bag 14, must have a selected porosity such that fine dust particles, particularly those having a particle size of 8 microns or less, are removed from the air stream passing through the bag, and the paper must also have sufficient strength to withstand the range of pressure drop normally encountered during the use of the bag. Such paper will usually have a nominal porosity ranging from about 10 to about 60 cubic feet per minute per square foot and most often from about 12 to about 35 cubic feet per minute per square foot. The thickness of the paper is less than 0.010 inch, e.g., from about 0.005 to about 0.008 inch, and the basis weight may be from about 20 to about 40 pounds per standard ream of 2,880 square feet. The tensile strength should be at least 5 pounds per lineal inch in both directions. For example, the Mullen strength may be from about 20 to about 50 pounds per square inch. Filter paper of the foregoing character, while effective in removing fine dust particles, also tends to become clogged after relatively short periods of use, as heretofore described.

The invention comprises a pre-filter means for removing fine dirt particles from the dirt and air stream before it reaches the filter bag 14. This pre-filter means may be in the form of a porous dust-entrapping surface which is exposed to the dirt and air stream generally upstream from the filter bag.

Preferably, the pre-filter is made of open cell sheet material such as foam rubber or foamed plastic. Urethane or polyurethane foams are particularly useful. The fine dirt particles in the air stream impinge against and become trapped in the porous surface of the pre-filter and remain embedded there instead of being carried to the filter bag where they would clog the porous openings of the filter bag. The entrapment of the fine dirt particles is effected primarily by surface contact of the dirt-laden air stream with the material of the pre-filter but without any substantial passage of the air stream through the wall of the pre-filter as in a filter bag.

In one form of the invention shown in FIGS. 2 and 3 a pre-filter 30 is in the form of a tubular lining for the interior of the exhaust duct 19. The pre-filter 30 has been formed to fit the interior of the duct 19 and comprises a polyurethane foam material. The dirt and air stream enters the lower end of the pre-filter 30, as indicated by the arrows in FIG. 3, and a substantial portion of the fine dirt particles are entrapped and remain in the surface of the foamed plastic material as the stream passes through the pre-filter. The dirt and air stream leaves the pre-filter and enters the dust collection chamber 29 through the branch duct 23. The air passes through the walls of the bag portion 27 as a result of the differential pressure between the inside and outside of the chamber 29, and the larger dust particles are filtered from the air stream along with any fine dust particles that were not trapped in the pre-filter 30. When the pre-filter 30 becomes dirty and laden with fine dirt particles, the door 20, heretofore mentioned, may be opened and the pre-filter 30 removed, washed or otherwise cleaned, and then returned. The pre-filter 30 is held in the exhaust duct 19 by means of the close frictional fit between the exhaust duct and the pre-filter due to the slightly resilient character of the tubular section of polyurethane foam.

While the pre-filter has been shown fitted in the exhaust duct of an upright cleaner it could also be fitted inside the hollow cleaning wand of a canister type cleaner. In such construction the pre-filter could be removed through an end opening of the wand.

Figure 4:
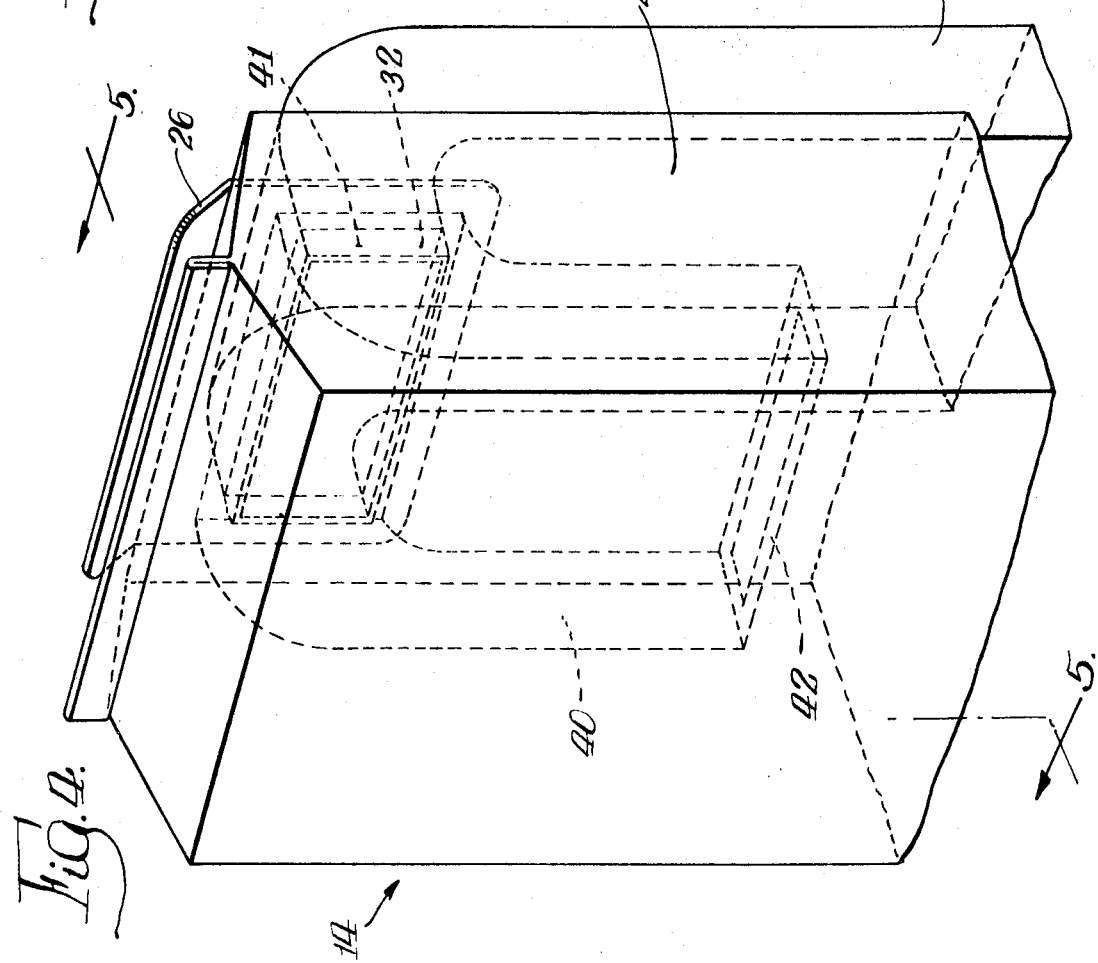
FIG. 4 is a fragmentary perspective view of a second form of the invention.

In another form of the invention the pre-filter is disposed inside the disposable filter bag. As shown in FIGS. 4 and 5, the exhaust duct, designated at 31, has no access opening but has a right-angle bend at its upper end to extend into the filter bag opening, as at 32. The pre-filter comprises a tubular section or sleeve 40 of polyurethane foam or the like and has one end 41 which is removably fitted over the open end of the duct portion 32 and an opposite end 42 which extends inwardly and hangs loosely downwardly into the bag portion 27. In this form the bag 14 is secured to the duct portion 32 by frictional engagement of the opening 28 in the bag collar 26 with the end 41 of the pre-filter 40. The dirt and air stream passes upwardly through a duct 31 and enters the pre-filter 40 at the end 41. The fine dirt particles are entrapped in the surface of the pre-filter 40, and the air stream containing large dirt particles and residual fine dirt particles leaves the pre-filter 40 at the open end 42 and enters the dust collection chamber 29. There the dirt is filtered from the air stream as it passes through the walls of the bag portion 27. Although the air stream may pass to some extent through the porous wall of the pre-filter 40, most of the air passes through the open end 42 so that the removal of fine particles is effected primarily by surface contact as in the previous embodiment.

From the disclosure it is evident that a novel and useful pre-filter has been provided which will remove fine dirt particles from the dirt and air stream before they are able to clog the pores of the filter bag. The result of using the pre-filter is that the filter bag will not become clogged and can be used to its full physical capacity without the development of excessive pressure drops.

I claim:

1. A filter for a vacuum cleaner, comprising a replacable pre-filter and a separate disposable paper filter bag of the type which removes dirt and fine dirt particles but tends to become clogged by said fine dirt particles, said disposable filter bag being made of paper having a porosity less than 60 cubic feet of air per minute per square foot of surface area, said pre-filter comprising an upright hollow exhaust duct connected at its lower end to the exhaust outlet of the vacuum cleaner and having at its upper end an access opening and a door for closing the access opening, a short lateral branch duct extending outwardly from the upright duct adjacent the upper end thereof, and a tubular liner of porous foam material in contact with the inner wall of the exhaust duct and extending from adjacent the lateral branch duct downwardly in the exhaust duct for a substantial extent thereof, said tubular liner being removably mounted in said upright exhaust duct and insertable and removable through said access opening for entrapping fine dirt particles exhausted by the vacuum cleaner, said disposable paper filter bag having an opening formed in a wall thereof and fitting closely around the lateral branch duct in air tight relationship therewith and supporting the filter bag thereon, the air stream exhausted from the vacuum cleaner passing through the branch duct and into the filter bag after passing through the foam liner in the upright duct, whereby a portion of the fine dirt particles in the air stream are collected by the porous foam liner of the pre-filter before the air stream enters the filter bag.

2. A filter for a vacuum cleaner comprising: an upright hollow exhaust duct connected at its lower end with the exhaust outlet of a vacuum cleaner and terminating at its upper end in a short laterally extending branch section; a tubular resilient pre-filter sleeve formed entirely of porous foam material disposed adjacent the upright exhaust duct and extending generally parallel thereto; the upper end of said tubular pre-filter sleeve extending laterally and being removably mounted on the outer end portion of the laterally extending branch section of the upright exhaust duct, and a disposable paper filter bag which removes dirt and fine dirt particles but tends to become clogged by the fine dirt particles, the filter bag being made of paper having a porosity of less than 60 cubic feet of air per minute per square foot of surface area, said filter bag having an opening formed in a wall thereof and fitting closely around and in air tight relationship with the outer surface of the laterally extending end of the tubular pre-filter sleeve and supporting the paper filter bag thereon with the tubular pre-filter sleeve enclosed within the paper filter bag and extending downwardly therein with its free open end spaced above the bottom of the paper filter bag, whereby the porous tubular pre-filter sleeve collects a portion of the fine dirt particles in the exhaust air stream of the vacuum cleaner passing into the filter bag from the upright exhaust duct and prevents them from reaching and clogging the paper filter bag.

* * * * *